з,043,341
Patented July 10, 1962

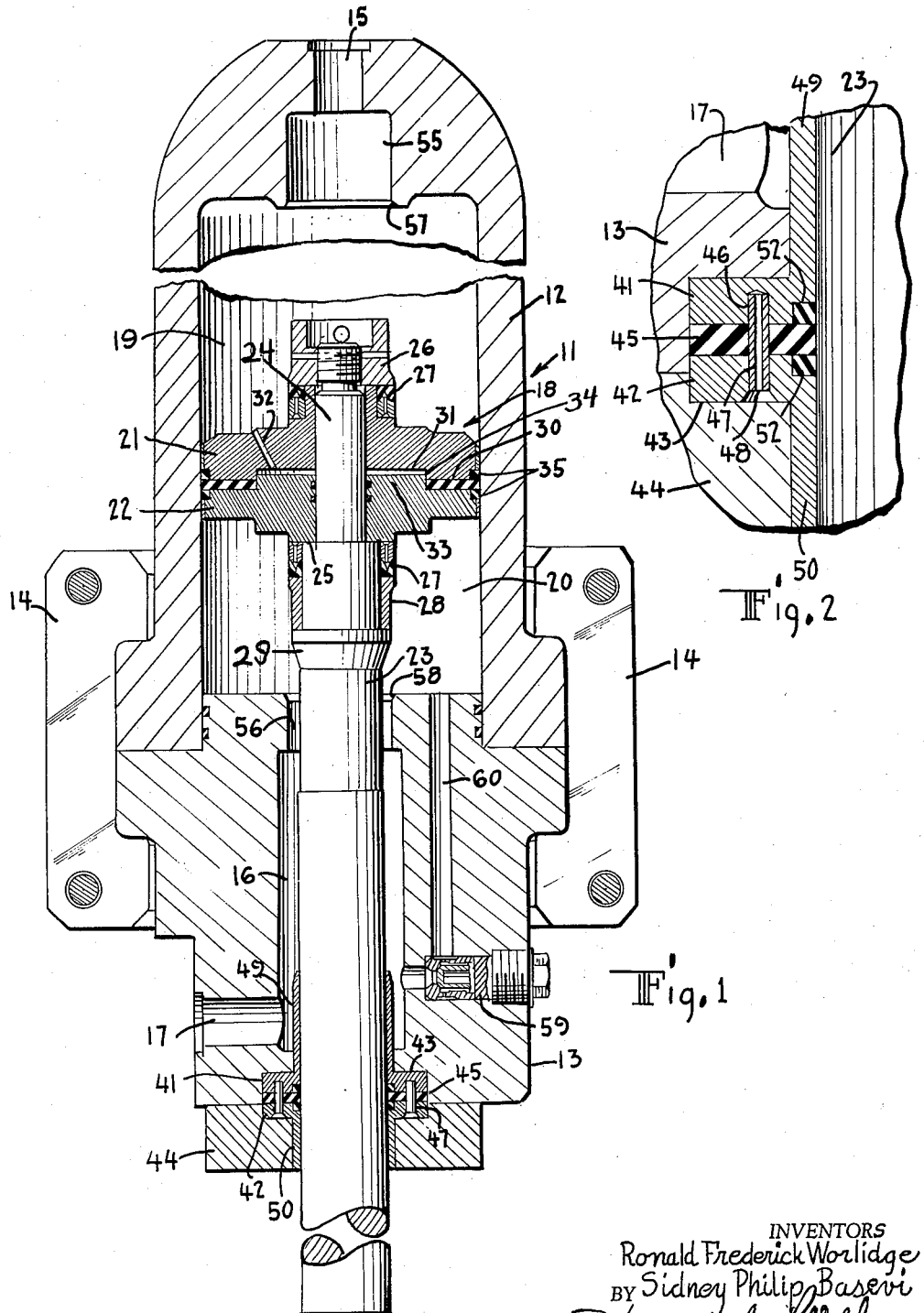

1

3,043,341
HYDRAULIC ACCUMULATOR
Ronald Frederick Worlidge, Lower Parkstone, Dorset, and Sidney Philip Basevi, Winton, Bournemouth, England, assignors to The Loewy Engineering Company Limited, Bournemouth, England, a company of Great Britain
Filed July 12, 1957, Ser. No. 671,564
5 Claims. (Cl. 138—31)

This invention relates to hydraulic pressure vessels and in particular to means for sealing a member reciprocable in such a pressure vessel. The invention is in particular applicable to hydraulic accumulators used for storing the operating liquid of a hydraulic press or any other hydraulic plant which requires for its working large quantities of liquid at high pressure. A gaseous medium—which may be compressed air—is nowadays generally used for placing the liquid in the accumulator under the required pressure.

The present invention is especially concerned with the provision of novel and improved liquid sealing means for the reciprocating parts of an accumulator wherein the liquid stored is oil and wherein the pressure is that required for the operation of hydraulic presses, this pressure being in the order of 3,000 to 4,000 p.s.i. and sometimes more. At these pressures effective separation of the oil from the gas contained in the accumulator is essential in order to prevent the oil from becoming partly absorbed in the gas, and vice versa. Oil which has absorbed gas foams and behaves to some extent like a compressible medium. If oil having an admixture of gas is used as the hydraulic working medium in the cylinders of a press, the movement of their pistons is slowed down and the resulting delays may lead to a considerable increase of the time required for a complete cycle of operation of the press. On the other hand oil absorbed by gas, apart from being lost for doing useful work, is apt to form deposits not only in the accumulator vessel itself, but also in the adjoining gas-filled spaces, including those inside the compressor and in valves in the gas circuit. These deposits form a sluge which interferes with the proper operation of the accumulator plant and which has therefore to be cleaned out from time to time. This necessitates the shutting-down of the accumulator and therefore also of the press plant with which the accumulator is associated.

Under certain conditions an effective separation of the hydraulic liquid from the loading gas in an accumulator can be obtained by placing inside a gas-filled accumulator vessel a collapsible sac of rubber or other elastic material which serves as a container for the liquid. This arrangement is, however, only practicable where the quantity of the liquid to be stored is small and its pressure low. In accumulators of the size required for storing liquid in the quantities and at the pressures used for the operation of hydraulic presses, rubber sacs cannot be employed as containers for the liquid to be stored. The usual arrangement is there to utilize the accumulator vessel itself as the container for the liquid and provide, as a means for separating the liquid from the loading gas—wherever such means are required—a piston which floats on the surface of the liquid so that the piston moves up and down in the accumulator vessel with the rise and fall of the liquid level. The piston therefore separates the interior of the accumulator vessel into two compartments, of which one is filled with gas and the other one with liquid. Normally, the piston is fitted with a seal around its circumference in order to prevent the leakage of gas past the piston into the liquid compartment or vice versa, that of the liquid into the gas compartment. For the reasons stated above the proper working of the

2 accumulator and of the hydraulic plant with which the accumulator is associated depends to a large extent on the effectiveness of the piston seal, in particular where the hydraulic liquid is oil.

In one type of gas-loaded hydraulic accumulator the piston is mounted on a rod which passes through the liquid compartment of the accumulator vessel and through its end wall to the outside. In some accumulators of this type the up and down movement of the outwardly projecting end of the rod is utilized for actuating valve means which control the supply of liquid to, and its discharge from the accumulator. Accumulators having rod-mounted separating pistons can be used for the storing of pressure water or pressure oil. Due to the piston rod projecting from the piston at one side thereof the area of the piston in contact with liquid is smaller than its area in contact with gas and the unit pressure of the liquid is consequently higher than that of the gas. While this diminishes the risk of gas leaking past the piston into the liquid compartment the risk of liquid penetrating into the gas compartment not only remains, but is even increased through the presence of the rod.

The arrangement of a piston-rod extending through the accumulator vessel to the outside atmosphere requires, further, the provision of additional sealing means for the rod where it passes through the wall of the accumulator vessel, in order to prevent the liquid leaking to the outside of the vessel and thus being lost. As the liquid pressure is far in excess of the atmospheric pressure, the risk of liquid leaking past the rod through the outside of the vessel is considerable.

The present invention is therefore mainly concerned with the provision of improved sealing means for the reciprocating parts of a hydraulic gas-loaded accumulator of the type having a rod-mounted separating piston. The sealing means according to the invention are of such a nature that they can be applied to the piston, for preventing the leakage of gas or liquid contained in the accumulator vessel past the piston from one compartment of the vessel to the other, and to the end wall of the accumulator vessel, for preventing the leakage of liquid past the piston rod to the outside of the accumulator vessel.

The sealing means according to the present invention comprise an assembly, consisting of two disc-shaped elements which are superposed upon each other and of a sealing ring made of an elastic and compressible material which is sandwiched between the two discs so as to space them apart from each other, the space between the discs not occupiel by the sealing ring being filled with gas at lower pressure than the liquid. The discs and the sealing ring are not fastened to each other but are movable towards each other under fluid pressure. Thus the disc on the liquid side will, when under pressure, move towards the other disc, and in doing so, place the sealing ring under a compressive load which will cause the sealing ring to spread radially towards and into the interval between the discs and the member reciprocable relative to the discs.

The internal pressure of the sealing ring which is also the sealing pressure is determined by the compressive force transmitted to the sealing ring from the disc on the liquid side. This compressive force has two components of which one is the force acting on that portion of the disc covered by the sealing ring and of which the other is the force acting on that portion of the disc which is not covered by the sealing ring. These components are again determined by the areas of the respective portions of the disc and by the unit pressures acting on them, the unit pressure acting on the covered disc portion being that of the liquid and the unit pressure acting on the uncovered portion of the disc being the difference between the liquid and the gas pressure acting on opposite sides of the disc.

Under these conditions the internal unit pressure in the sealing ring is in excess of the unit pressure of the liquid whereby the leakage of liquid past the ring is prevented. The amount of excess internal unit pressure in the sealing ring is determined by the ratio of the areas of the uncovered part of the disc to the covered part and by the afore-mentioned difference in unit pressures.

The sealing means according to the invention are applied to a rod-mounted separating piston of a hydraulic gas-loaded accumulator, the assembly constituted by the two discs and the sealing ring forming the separating piston itself, and the discs being mounted at one end of the rod as to be capable of movement towards each other when under liquid and gas pressure. In those cases where the sealing means according to the invention are applied to the end wall of the accumulator vessel, the assembly constituted by the two discs and the sealing ring may be encased in a cavity in that end wall, with the rod to be sealed passing through the centre of the assembly.

An embodiment of the invention will now be described, by way of example, with reference to the accompanying drawing, in which:

FIG. 1 is a longitudinal section through a pressure vessel, incorporating the features of the invention, FIG. 2 is a detail of a part of the pressure vessel of FIG. 1, at a larger scale.

The drawing shows the invention applied to a gas-loaded hydraulic accumulator which comprises a housing or vessel 11 having a cylindrical side wall 12 and a head 13. The vessel and the head when assembled form together a container for storing a hydraulic liquid such as oil under the pressure of a gas, which may be nitrogen. The vessel 11 and the head 13 are held together in a fluid-tight manner by such means as clamps 14. The end of the vessel 11 has a central bore 15 forming a passageway for the gas and the head 13 has a central bore 16 forming a passageway for the liquid, with a lateral branch 17 for the connection of a pipe-line, not shown.

The upper part of the vessel 11 is normally filled with gas under the required pressure and the lower part with the liquid to be stored. These two media are separated from each other by a piston assembly 18 which divides the interior of the vessel into a gas compartment 19 and a liquid compartment 20. The piston assembly is constituted by two discs 21 and 22 superposed upon each other and mounted at the end of a rod 23 which passes through the liquid compartment 20 into the bore 16 and to the outside of the accumulator vessel 11. The two discs are arranged on a reduced end portion 24 of the rod 23 and between a shoulder 25 and a nut 26 threaded to the end of the reduced rod portion 24. Suitable packings 27 are arranged between the disc 21 and the nut 26 and between the disc 22 and a sleeve 28, respectively, which latter is supported on a flange 29 of the rod 23.

Sandwiched between the two discs 21 and 22, so as to keep them spaced apart from each other, is a flat sealing ring 30 which is made of an elastic and compressible material. The ring 30 will therefore spread radially when subjected to axial pressure and its internal pressure will be the same in all directions as it will behave, when under compression, like a fluid under hydrostatic pressure. The ring can therefore be compared to a body of fluid of high viscosity under hydro-static pressure. At its outer periphery the ring 30 is in contact with the inside wall of the vessel 11. The inner diameter of the ring is considerably larger than that of the bore in the discs 22 and 21 provided for rod extension 24 so that only a portion of the space between the discs is occupied by the ring 30 whilst the remainder forms a chamber 31 which is filled with gas from the gas compartment 19 through a passageway 32 in the disc 21. The disc 22 is formed in its centre with a boss 33 around which the ring 30 fits snugly and which protrudes into a counter-bore 34 formed in the centre of the disc 21 so that the discs 21 and 22 are centred upon each other, the chamber 31 forming part of the counter-bore 34.

The discs 22 and 21 and the ring 30 are not fastened together and are merely held together by the pressure of the gas and of the liquid in the compartments 19 and 20 respectively. The rod 23 is free to slide relative to the vessel 11 and the head 13 so that the assembly formed by the discs 21, 22 and the sealing ring 30 as well as the rod 23, with its attachments, will rise and fall in accordance with the level of the liquid in the compartment 20.

When the compartments 19 and 20 are filled with gas and liquid under pressure respectively, the assembly 18 of the discs 21 and 22 is urged towards the nut 26 or the shoulder 25 according to whether the assembly 18 rises or falls. In either case the ring 30 is subjected to a compressive force which will cause the ring material to spread outwardly towards and into the interval between the discs and the inside wall of the vessel 11. The internal pressure in the sealing ring 30 can be determined as follows:

Let:

A be the cross-sectional area of the gas compartment 19,
B be the cross-sectional area of the liquid compartment 20,
C be the cross-sectional area of the sealing ring 30,
D be the cross-sectional area of the chamber 31,
$p_1$ be the unit pressure of the gas,
$p_2$ be the unit pressure of the liquid,
$e$ be the excess unit pressure in the sealing ring 30 over the unit pressure $p_2$ of the liquid, Then:
$$p_1 \times A = p_2 \times B$$

Hence:
$$p_1 = p_2 \times \frac{B}{A}$$

In practice:
$$B = 0.9A$$

Hence:
$$p_1 = 0.9 p_2$$

The compressive force acting on the sealing ring 30 is the sum of two components F1 and F2, of which:
$$F1 = p_2 \times C$$
$$F2 = (p_2 - p_1) \times D$$

Hence:
$$F1 + F2 = p_2 \times C + (p_2 - p_1) D$$

Further:
$$F1 + F2 = (p_2 + e) C$$

Hence:
$$e \times C = (p_2 - p_1) D$$
$$e = (p_2 - p_1) \frac{D}{C}$$

The excess unit pressure $e$ is therefore determined by two factors, one of them being the difference in the unit pressures between the gas and the liquid in the vessel 11 and the other one the ratio of the area of the chamber 31 to that of the sealing ring 30. It will be clear from the foregoing that the larger the difference in unit pressures the smaller can be the ratio in areas, for a given excess unit pressure $e$.

In practice it will be sufficient to make $e$ approximately 5% of $p_2$ in order to prevent leakage of the liquid into the gas compartment. Leakage of gas into the liquid compartment is prevented already by the unit pressure $p_2$ being higher than the unit pressure $p_1$, but the excess unit pressure $e$ acts as an additional safety factor in that direction.

The afore-described arrangement of the sealing ring 30 sandwiched between the discs 21 and 22 has the further advantage that any wear of the sealing ring due to its rubbing contact with the inside wall of the vessel 11 is automatically compensated by the radial spread of the ring under the compressive force to which it is subjected. Any wear at the circumference of the ring will therefore be made good by a reduction in height of the ring without impairing its sealing properties.

Backing rings 35 are preferably provided at opposite sides of the ring 30 and immediately adjacent to it in order to prevent extrusion of the ring 30 into the interval between the discs 21, 22 and the inside wall of the pressure vessel 11.

A suitable material for the ring 30 may be synthetic rubber, which, under pressure, does not tear or crumple; the backing rings 35 may be made of fabric bonded synthetic rubber. It is obvious that the material for both the sealing ring 30 and the backing rings 35 must be such as not to be attacked by oil.

Sealing means similar to those described before are further provided in the head 13 for preventing leakage of liquid from the compartment 20 and the bore 16 past the rod 23. These means are preferably arranged at the outer end of the head 13 near the point where the rod passes to the outside, and they comprise two discs 41 and 42 superposed upon each other and having a central opening for the passage of the rod 23 there-through. The discs 41, 42 are encased in a cavity 43 which is partly formed in the end surface of the head 13 and partly in a cover plate 44. Sandwiched between the discs 41 and 42 is a sealing ring 45, which keeps them spaced apart from each other.

The assembly formed by the discs 41, 42 and the sealing ring 45 is subjected to a compressive force through the pressure liquid in the passageway 16 which tends to urge the upper disc 41 towards the lower disc 42. No fastening means are provided between the two discs and the sealing ring 45 so that the upper disc can freely follow the movement imposed onto it by the compressive force whereby the sealing ring 45 is placed under compression. This sealing ring consists of a material similar to that used for the sealing ring 30, so that the ring, when under compression, will spread radially towards the rod 23 and into the interval between the rod and the discs.

The sealing ring 45 is provided with a series of holes 46 arranged on a circle concentric to the rod. These holes extend through the entire thickness of the lower disc 42 and through part of the thickness of the upper disc 41 and they are under atmospheric pressure. Pins 47 (FIG. 2) with vent holes 48 are preferably positioned in the holes 46 in order to prevent the material of the sealing ring 45 spreading into the holes 46 and thereby blocking the latter.

Here again only part of the upper disc 41 is covered by the sealing ring 45 whilst the uncovered portion is under lower pressure. The conditions are therefore similar to those described above in connection with the discs 21, 22 and the sealing ring 30, and the internal pressure in the sealing ring 45 will be in excess of the liquid pressure by an amount $e$ which is determined by the difference between the liquid and the atmospheric pressure and the ratio between the uncovered and the covered areas of the disc 41. Inasmuch as the pressure difference is comparatively high and much higher than in the case of the sealing ring 30, the ratio between the two areas can be made correspondingly smaller for a given excess pressure $e$.

The discs 41 and 42 are formed at their outer ends with tubular extensions 49 and 50 respectively which serve as guides for the rod 23.

Backing rings 52 having the same function as the backing rings 35 are arranged at opposite sides and adjacent to the sealing ring 45, so as to prevent extrusion of the sealing ring into the interval between the rods and the discs.

As mentioned before, the piston assembly 18 rises and falls together with the level of the liquid stored in the compartment 20. If the piston assembly approaches its top-most or bottom-most position at a relatively high speed shocks may result which are transmitted in the form of waves to the gas or liquid contained in the adjoining pipe systems and further, to the working cylinders of the press and other apparatus. These shocks have detrimental effects, and means are therefore provided in the accumulator according to the invention to lessen the shocks.

The piston assembly 18 is provided at both or one of its sides with a central boss-like projection which, at the end of the stroke of the piston, enters a correspondingly shaped chamber in the central bores 15 or 16, respectively, of the accumulator, the bosses acting as plungers which displace before them the gas or liquid contained in the respective chambers.

The boss on the gas side of the piston assembly 18 may be formed by the nut 26 and the boss on the liquid side of the piston assembly may be formed by the sleeve 28. The central bore 15 has an enlarged portion 55 which is adapted to be entered by the nut 26 and the central bore 16 has a chamber 56 which is adapted to be entered by the sleeve 28. Both the nut 26 and the sleeve 28 have a base which is slightly larger in diameter than the rest and connected thereto by a short conical section. The diameter of the chamber 55 corresponds to that of the base of the nut 26 and the diameter of the chamber 56 to the base of the sleeve 28. Both chambers have entries 57, 58, respectively, which taper outwardly.

With this arrangement, the nut 26 enters first with its slender portion the chamber 55, when the piston assembly 18 approaches the top end of its stroke. Gas will continue to be displaced by the piston assembly from the compartment 19 into the chamber 55 until the base part of the nut enters this chamber, cutting off through the packing 27 any further flow of gas from the compartment 19 into the chamber 55. The transition between these two stages will, however, not be an abrupt one due to the co-operation of the conical part of the nut with the tapered entry 57 of the chamber 55. The same conditions apply in respect of the entry of the sleeve 28 into the chamber 56 during the approach by the piston assembly 18 of the bottom end of its stroke. The quantity of fluid displaced during the end of the stroke of the piston assembly 18 is thus diminished in steps whereby shocks are dampened to a considerable degree.

After the piston assembly has reached one of its endmost positions, for instance the bottom one, most—or in some cases all—of the pressure liquid may have left the compartment 20, with the result that the piston assembly 18 is subjected predominantly, or in some cases exclusively, to pressure from the gas compartment 19 and it is therefore unable to rise again. In order to obviate this, an adjustable non-return valve 59 is arranged in the head 13 which is opened at a pre-determined pressure in the central bore 16 and establishes through a passageway 60 in the head 13 a communication between the central bore 16 and the compartment 20 so that liquid in sufficient quantities can flow into that compartment and counter-balance the pressure from the gas compartment 19. Similar arrangements, which are not shown here, may be made in respect of the gas compartment 19 in the form of a non-return valve arranged in the top of the pressure vessel 11 and establishing a communication between the central bore 15 and the chamber 19, which communication by-passes the chamber 55.

We claim:

1. A hydraulic gas-loaded accumulator comprising a vessel, a piston displaceable in said vessel and partitioning the space in said vessel into two compartments of which one is filled with hydraulic liquid and the other one with the loading gas, a piston rod extending through said piston and, extending from one side only of said piston to the outside of said vessel, said piston consisting of two superposed discs, a sealing ring placed between said discs and contacting the inside wall of said vessel, said sealing ring being made of an elastic and compressible material which when under compression will behave like a fluid under hydrostatic pressure, said sealing ring having an area smaller than the area of said discs and overlying approximately the outer half of the radius of said discs so as to leave a free space between the central portion of said discs, around said piston rod, said sealing ring being of a thickness so as to provide said free space between said discs at all times and a seat for said piston, formed on said piston rod against which said piston is urged by the fluid medium in the compartment, which is opposite the compartment through which said rod extends, said space between said discs being permanently in free communication with that side of said piston which is opposite to that from which said rod extends.

2. A gas-loaded hydraulic accumulator, according to claim 1, in which a non-return valve is arranged in a by-pass of the passageway for the liquid in the end walls of the accumulator vessel, so that liquid is admitted to the liquid compartment when the piston has reached the end of its stroke.

3. In a gas-loaded hydraulic accumulator vessel having a gas compartment and a liquid compartment, a piston rod, a separating piston mounted on said piston rod and arranged between the liquid compartment and the gas compartment of said accumulator vessel, the unit pressure in the liquid compartment being greater than the unit pressure in the gas compartment, means providing a seal between the liquid compartment and the gas compartment, said means comprising an assembly of two disc-shaped elements which are loosely mounted on said piston rod so as to be movable toward and from each other, superposed upon each other, and a sealing ring, contacting the inside wall of said accumulator vessel and made of an elastic and compressible material which is sandwiched between the two discs, so as to space them apart from each other at all times, the entire area of the sealing ring, where it contacts the surfaces between the discs being smaller than the area between the discs leaving a space between the discs inside the inner diameter of said sealing ring, which space is in communication with said gas space and is filled with gas having a lower pressure than the pressure in the liquid compartment, the diameter of the piston rod being less than the internal diameter of the sealing ring, the pressure on said sealing ring being in excess of the pressure of said liquid and a function of the difference between said liquid and gas pressures multiplied by the ratio of the area of said gas space between the discs with respect to said area of said sealing ring.

4. A gas-loaded hydraulic accumulator, according to claim 3, in which the assembly constituted by the two discs and the sealing ring forms the separating piston itself, the discs being mounted at one end of the rod so as to be capable of movement towards each other when under liquid and gas pressure.

5. A gas-loaded hydraulic accumulator, according to claim 3, in which the disc at the liquid side is formed with a central boss projecting and fitting into a counter-bore in the other disc whilst the sealing ring fits snugly around the boss, the counter-bore being in communication with the gas compartment.

References Cited in the file of this patent

UNITED STATES PATENTS

| | | |
|---|---|---|
| 1,858,815 | Becker | May 17, 1932 |
| 2,129,145 | Lincoln | Sept. 6, 1938 |
| 2,363,142 | Reed | Nov. 21, 1944 |
| 2,518,097 | Thornhill | Aug. 8, 1950 |
| 2,546,055 | Ballard | Mar. 20, 1951 |
| 2,567,527 | Parks | Sept. 11, 1951 |
| 2,714,899 | Kane | Aug. 9, 1955 |
| 2,729,244 | Alaska et al. | Jan. 3, 1956 |
| 2,743,741 | Ord | May 1, 1956 |
| 2,754,847 | Ashton et al. | July 17, 1956 |
| 2,784,013 | Green | Mar. 5, 1957 |